United States Patent
Kingsford et al.

[11] Patent Number: 5,967,173
[45] Date of Patent: Oct. 19, 1999

[54] DIAPHRAGM VALVE WITH LEAK DETECTION

[75] Inventors: Kenji A. Kingsford, Devore; Hy Ba Nguyen, Upland, both of Calif.

[73] Assignee: Furon Corporation, Laguna Niguel, Calif.

[21] Appl. No.: 08/914,058

[22] Filed: Jul. 14, 1997

[51] Int. Cl.⁶ ............................ F16K 11/48; F16K 31/126
[52] U.S. Cl. ................. 137/312; 137/625.5; 137/625.66; 254/61.3; 254/335.2
[58] Field of Search ................................ 137/312, 625.5, 137/625.66; 251/61.3, 61.4, 61.5, 331, 335.2, 335.3; 92/98 R

[56] References Cited

U.S. PATENT DOCUMENTS

| | | | |
|---|---|---|---|
| 697,284 | 4/1902 | Skiffington | 251/223 |
| 1,879,413 | 9/1932 | Muller | 251/61.3 |
| 1,939,150 | 12/1933 | Terry | 251/61.3 |
| 2,249,258 | 7/1941 | Shaw | 251/61.4 |
| 2,365,650 | 12/1944 | Shaw et al. | 251/335.2 |
| 2,715,009 | 8/1955 | Beekley et al. | 251/61.3 |
| 2,732,166 | 1/1956 | Rayner | 251/88 |
| 3,303,852 | 2/1967 | Miller | 137/87 |
| 3,540,478 | 11/1970 | Ito | 137/625.5 |
| 3,546,690 | 12/1970 | Kalert | 340/242 |
| 3,794,075 | 2/1974 | Stoll et al. | 137/625.66 |
| 3,838,707 | 10/1974 | Wachowitz, Jr. | 137/312 |
| 4,010,769 | 3/1977 | De Lorenzo et al. | 137/312 |
| 4,694,848 | 9/1987 | Jorgensen et al. | 137/114 |
| 4,711,269 | 12/1987 | Sule | 137/625.5 |
| 4,776,368 | 10/1988 | Drozd | 137/505.43 |
| 4,794,940 | 1/1989 | Albert et al. | 137/1 |
| 4,821,776 | 4/1989 | Ariizumi et al. | 137/625.4 |
| 4,901,751 | 2/1990 | Story et al. | 137/312 |
| 4,971,523 | 11/1990 | Wacker et al. | 417/63 |
| 5,002,086 | 3/1991 | Linder et al. | 137/312 |
| 5,178,366 | 1/1993 | Kojima et al. | 251/335.2 |
| 5,217,043 | 6/1993 | Novakovi | 137/460 |
| 5,261,442 | 11/1993 | Kingsford et al. | 137/312 |
| 5,345,857 | 9/1994 | Murphy | 92/34 |
| 5,546,987 | 8/1996 | Sule | 137/625.5 |

*Primary Examiner*—George L. Walton
*Attorney, Agent, or Firm*—Christie, Parker & Hale, LLP

[57] ABSTRACT

A valve assembly comprises a valve body and at least one valve seat is disposed within the valve body. A groove is disposed therein concentrically around the valve seat. A poppet assembly is disposed within the valve body and comprises an imperforate valve stem and a valve plug at an end of the valve stem. For three-way flow, the valve body includes two valve seats, and a valve plug at each valve stem end. A cap is attached to an end of the valve body top and a first flexible imperforate diaphragm is disposed within the cap. A second flexible imperforate diaphragm is disposed within the valve body between the poppet assembly and the first diaphragm, and forms a leak-tight seal with the valve body. A base is attached to an opposite end of the valve body. A third flexible imperforate diaphragm is disposed in the valve body between the poppet assembly and the base, and forms a leak-tight seal with the valve body. A spring means is disposed between the base and the third diaphragm for imposing a biasing force onto the poppet assembly. A containment body is used to encapsulate the spring means and isolate it from any liquid that leaks past the third diaphragm.

35 Claims, 8 Drawing Sheets

DIAPHRAGM VALVE WITH LEAK DETECTION

FIELD OF THE INVENTION

This invention relates to valves which can be used both with corrosive liquids without valve component degradation and with chemically pure liquids without deleteriously affecting the liquids' purity. More particularly, this invention relates to improved diaphragm valves that incorporate diaphragms, which are in contact with the liquids and components which provide for detection of any liquids which may leak through the diaphragms, and isolate any metallic components from any liquid which may leak through the diaphragms.

BACKGROUND OF THE INVENTION

Various types of fluid flow control valves are used in applications where the valve is subjected to corrosive acidic or caustic liquids, or where the purity of the liquids which flow through the valve must be maintained. Such valves are constructed of relatively inert materials, e.g., fluoropolymers or other polymeric materials, or the valve surfaces which come into contact with the flowing liquids, or which potentially can come into contact with the liquids, are coated with inert materials. Such flow control valves are commonly biased closed by a spring force and are opened by means of a solenoid actuator, or by pneumatic or hydraulic pressure, or the like. When valve closure springs are used, it can be important that the force required to be exerted by the spring to close the valve is minimized. By minimizing the required spring force, the spring imparts less stress to the valve structures, thereby increasing the length of valve life.

Fluid control valves sometimes include a diaphragm which is in contact with the fluid and which provides a barrier against escape of the fluid into the valve operating mechanism or into the atmosphere. In some designs, a backup diaphragm is provided which, in combination with the barrier diaphragm, provides a chamber to contain any fluid which may leak through the barrier diaphragm. Such chambers are sometimes provided with leak ports, so that, if the barrier diaphragm fails, the fluid which passes through the diaphragm into the chamber will be detected and appropriate action can be taken.

For example, U.S. Pat. No. 4,010,769 discloses a valve which incorporates a barrier diaphragm which contacts the fluid which flows through the valve. A second diaphragm is in the valve above the first diaphragm, and a leak port is between the diaphragms. Any fluid which may leak through the barrier diaphragm will be detected by means of the leak port and appropriate corrective action can be taken.

When a valve incorporates a diaphragm which contacts the fluid in a system, and the diaphragm is connected to the valve operating mechanism, as is the case with the valve disclosed in the '769 patent, any force which the fluid exerts on the diaphragm is transmitted to the valve operating mechanism and, thus, affects the operation of the valve. For example, in the '769 valve, a spring biases the valve closed and the valve opens by means of a solenoid. Any force exerted on the barrier diaphragm by the fluid in the system will tend to open the valve. Therefore, a larger spring is required to hold the valve closed than would be necessary if the valve was designed so that the force on the diaphragm tending to open the valve would be counterbalanced by another force in the opposite direction. The use of a larger spring results in more stresses than necessary being imparted on the valve structure, thereby tending to reduce the length of the life of the valve.

When a valve is provided with a diaphragm that is attached to the valve's operating mechanism which therefore moves with the mechanism as the valve opens and closes, the diaphragm can fail due to fatigue cracking. Usually, the greater the distance the diaphragm moves, and the more stretch and strain that is applied to the diaphragm during each cycle, the fewer cycles the diaphragm will be able to withstand before failing. Thus, it is important to minimize the length of diaphragm travel, and the strain on the diaphragm, to increase valve life.

U.S. Pat. No. 5,261,422 describes a diaphragm valve that is constructed to minimize spring force required to close the valve and, thereby reduce the stress on the valve components and increase valve life. Referring to FIG. 1, a three-way valve embodiment 10 disclosed in the '422 patent comprises a valve body 12 having a top 14 and a bottom 16, with a fluid inlet passage 18 through the side of the valve body 12 at a first location, a first fluid outlet passage 20 through the side of the valve body at a second location, and a second fluid outlet passage 22 through the side of the valve body at a third location. The first, second and third locations are spaced apart radially from each other around the body of the valve.

An upper valve seat 24 facing toward the valve body top 14 is located in the valve body between the inlet passage 18 and the first outlet passage 20. A lower valve seat 26 facing toward the valve body bottom 16 is located in the valve body between the inlet passage 18 and the second outlet passage 22. A cap 28 is removably mounted on the valve body top 14, and a first flexible imperforate diaphragm 30 is mounted on the inside of the cap. A second flexible imperforate diaphragm 32 is mounted across the upper portion of the valve body above the upper facing valve seat 24. The second diaphragm 32 is spaced below the first diaphragm 30 and forms an upper barrier for fluid flowing through the valve. The space between the first and second diaphragms forms an upper fluid containment chamber 34. A base 36 is removably mounted on the valve body bottom 16. A third flexible imperforate diaphragm 38 is mounted across a lower portion of the valve body 12 below the lower valve seat 26. The third diaphragm 38 forms a lower barrier for fluid flowing through the valve.

A poppet assembly 40 is connected between the second and third diaphragms and moves with the diaphragms. The poppet assembly 40 comprises a lower valve plug 42 connected to the upwardly facing surface of the third diaphragm 38, and an upper valve plug 44 connected to the downwardly facing surface of the second diaphragm 32. The lower valve plug 42 is configured to engage the lower facing valve seat 26 to stop the flow of fluids from the inlet 18 through the second outlet passage 22. The upper valve plug 44 is configured to engage the upper facing valve seat 24 to stop the flow of fluids from the inlet 18 through the first outlet passage 20.

A valve stem 46, which has one end integrally formed with one of the upper or lower valve plugs, extends through the center portion of the valve body 12, with the other end of the valve stem removably connected to the other valve plug. The connection between the valve stem and the valve plug forms a fluid-tight seal between the valve stem and the plug. A bolt 48 is disposed through the valve stem 46 and is used to attach the lower valve plug 42 thereto, and extends through the third diaphragm 38.

A spring 50 is in the space between the third diaphragm 38 and the base 36 for biasing the poppet assembly 40 and the connected second and third diaphragms in an upwardly direction for engaging the lower valve plug 42 with the downwardly facing lower valve seat 26 to stop the flow of fluids from the inlet 18 through the second outlet passage 22, while, at the same time, disengaging the upper valve plug 44 from the upwardly facing upper valve seat 24 to allow flow of fluids from the inlet 18 through the first outlet passage 20. Means are provided to counteract the spring force for moving the poppet assembly 40 and the connected second and third diaphragms in a downwardly direction for engaging the upper valve plug 44 with the upwardly facing valve seat 26 to stop the flow of fluids from the inlet 18 through the first outlet passage 20.

While the valve disclosed in the '422 patent is designed to use a minimum spring force for biasing the valve, and to reduce the distance the diaphragm must travel and the strain on the diaphragm so that the operation life of the valve is enhanced, there are design features of the valve that can be improved upon in an effort to: (1) further minimize the potential for contaminating chemically pure liquids by contact of leaking liquid with metallic valve elements; (2) provide an improved leak-tight seal between the respective valve plugs and valve seats; and (3) further minimize the number of potential leak paths through the valve. It is, therefore, desired to provide to the art an improved diaphragm valve for use with either chemically pure or corrosive liquids that comprises such improved design features.

SUMMARY OF THE INVENTION

A valve assembly is provided for controlling the flow of either corrosive or chemically pure liquids without being damaged by the corrosive liquids or without contaminating the pure liquids. The design features of the valve further minimize the potential for contaminating chemically pure liquids by contact of leaking liquid with metallic valve elements, provide an improved leak-tight seal between the valve plugs and valve seats, and further minimize the number of potential leak paths through the valve. Further design features of this valve assembly minimize the spring force required to close the valve, thereby reducing the stress on the valve components and increasing valve life. Additionally, the unique construction of the valve permits its construction and assembly without the need for using elastomeric-type O-ring seals or the like to prevent leakage from one region of the valve to another.

Valve assemblies, constructed according to principles of this invention, comprise a valve body having a central fluid transport chamber that extends therethrough. The valve body includes a fluid inlet and at least one fluid outlet, that are each disposed through wall portions of the valve body. The valve body has an open top end and an open bottom end. At least one valve seat is disposed within the valve body at an edge of the central chamber. The valve body includes a groove that is disposed therein concentrically around the valve seat.

A poppet assembly is disposed within the valve body and comprises an imperforate valve stem that is disposed within the central fluid transport chamber. A valve plug is disposed at one end of the valve stem and is positioned outside of the central chamber adjacent the valve seat. In the event that three-way flow is desired, the valve body includes two valve seats, one at each edge of the central chamber, and a valve plug is disposed at each opposite valve stem end. The groove around the valve seat both enables the valve seat to expand radially when contacted by a respective valve plug to provide an improved leak-tight seal therebetween and resists valve seat fatigue and failure after repeated valve cyclings. Placement of the valve plug against a respective valve seat controls the migration of liquid through the valve from the liquid inlet to the liquid outlet. The valve stem is of an imperforate design, i.e., is not bored completely through, to eliminate a potential leak path for liquid through the valve to otherwise non-wetted areas of the valve or to the environment.

A cap is attached to the valve body top end, and a first flexible imperforate diaphragm is disposed within the cap. A second flexible imperforate diaphragm is disposed within the valve body between the poppet assembly and the first diaphragm, and is connected to one end of the poppet assembly. The second diaphragm forms a leak-tight seal with the valve body. A base is attached to the valve body bottom end, and a third flexible imperforate diaphragm is disposed in the valve body between the poppet assembly and the base. The third diaphragm is connected to an end of the poppet assembly opposite the second diaphragm, and forms a leak-tight seal with the valve body.

A spring means is disposed between the base and the third diaphragm for imposing a biasing force onto the poppet assembly, and a containment body is used to encapsulate the spring means and isolate it from liquid leaking past the third diaphragm. The containment body forms a leak-tight seal against the base and has a thin wall sleeve that accommodates axial displacement of the spring means within the valve body. The use of the containment body is designed to minimize contact with any liquid that has leaked past the third diaphragm to thereby further minimize the possibility of contaminating high purity chemical process liquid.

BRIEF DESCRIPTION OF THE DRAWINGS

These and other features, aspects, and advantages of the present invention will be more fully understood when considered with respect to the following detailed description, appended claims, and accompanying drawings, wherein:

DETAILED DESCRIPTION

Diaphragm valves of this invention are an improvement of the diaphragm valves disclosed and illustrated in U.S. Pat. No. 5,261,422, which is hereby incorporated by reference.

Figure 1:
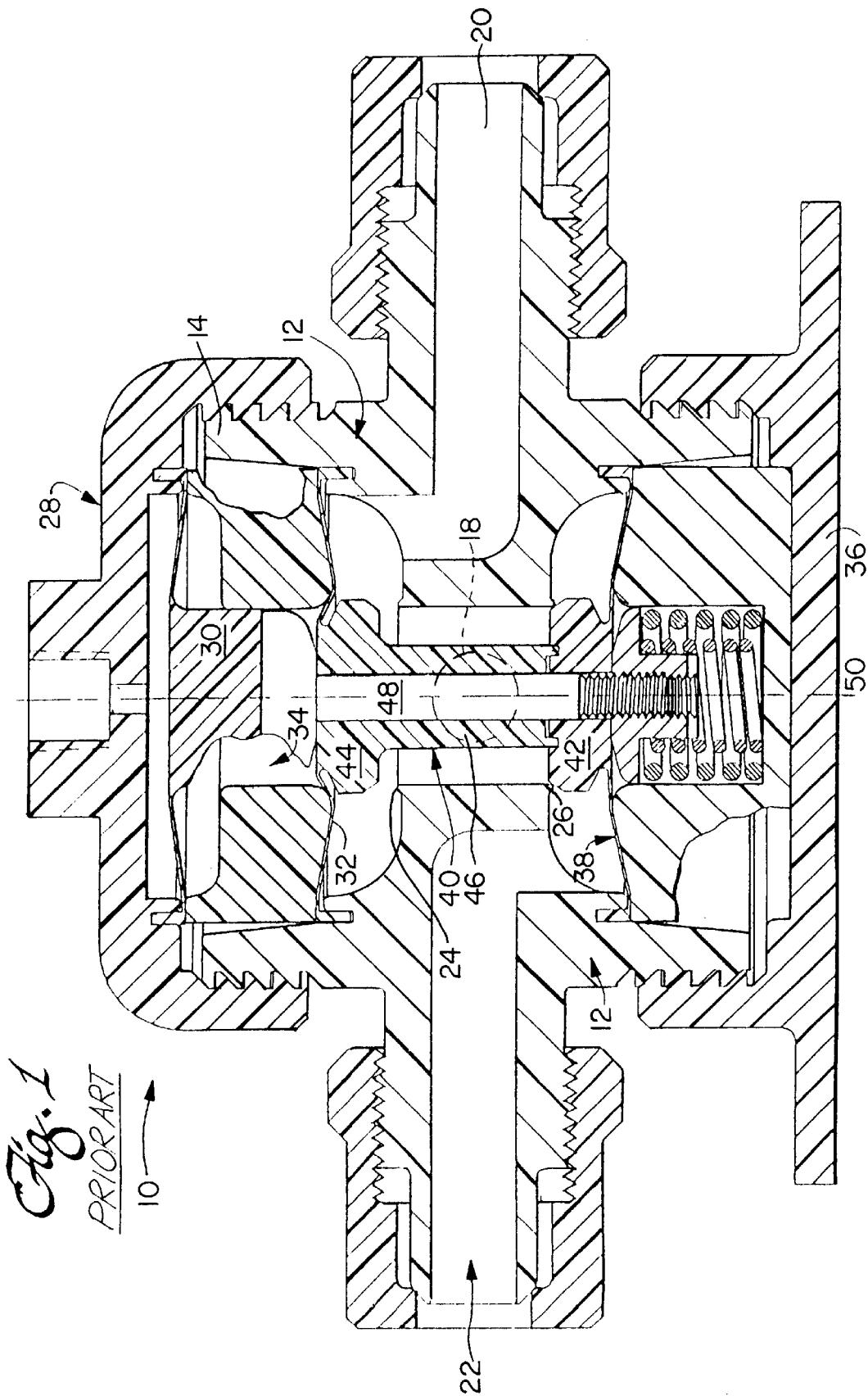
FIG. 1 is a semi-schematic, cross-sectional side view of a three-way valve of U.S. Pat. No. 5,261,442.
Figure 2:
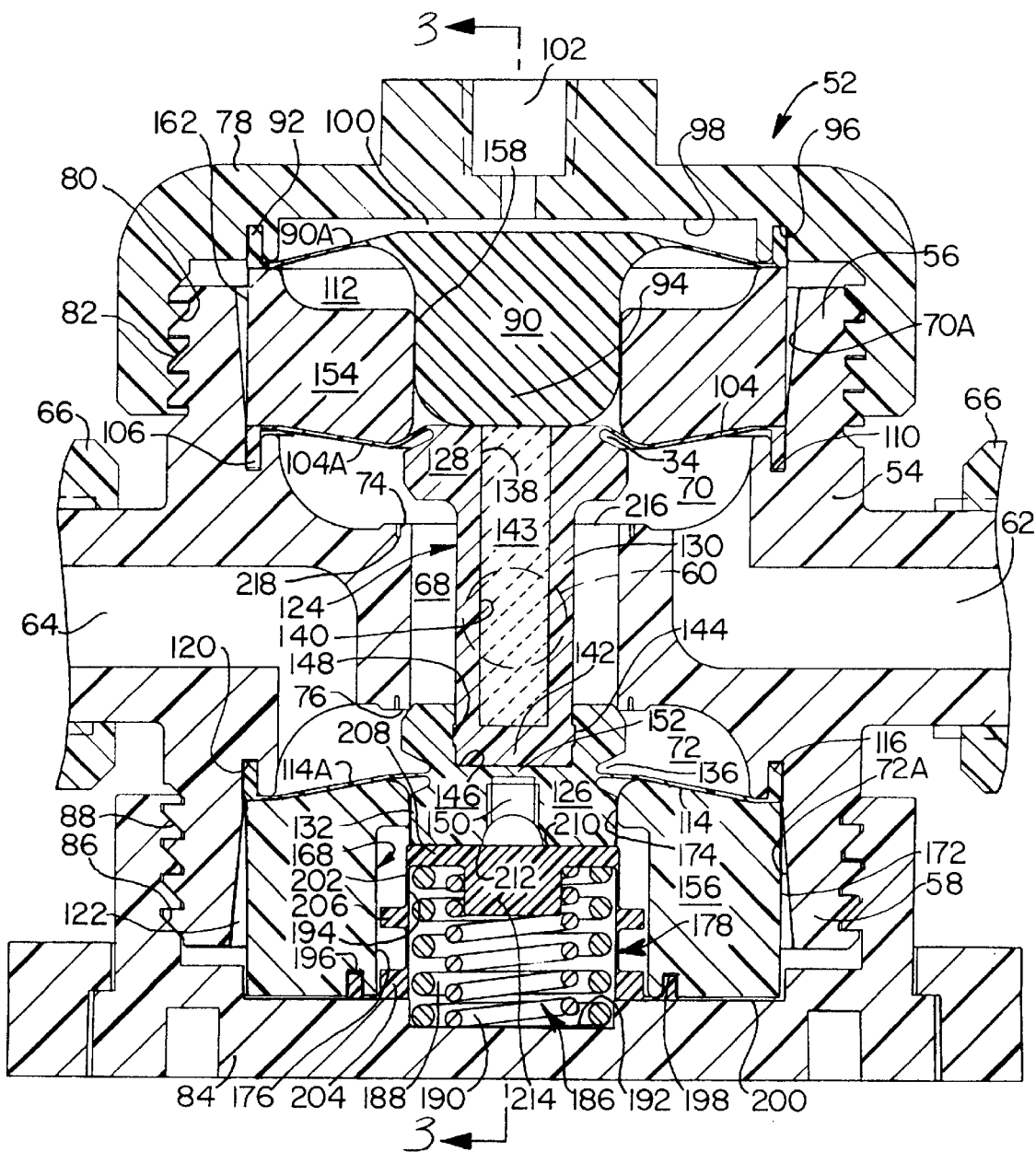
FIG. 2 is a semi-schematic, cross-sectional side view of one embodiment of the valve assembly provided in accordance with practice of the present invention in a first operating condition for controlling the flow of corrosive or chemically pure liquids.
Figure 3:
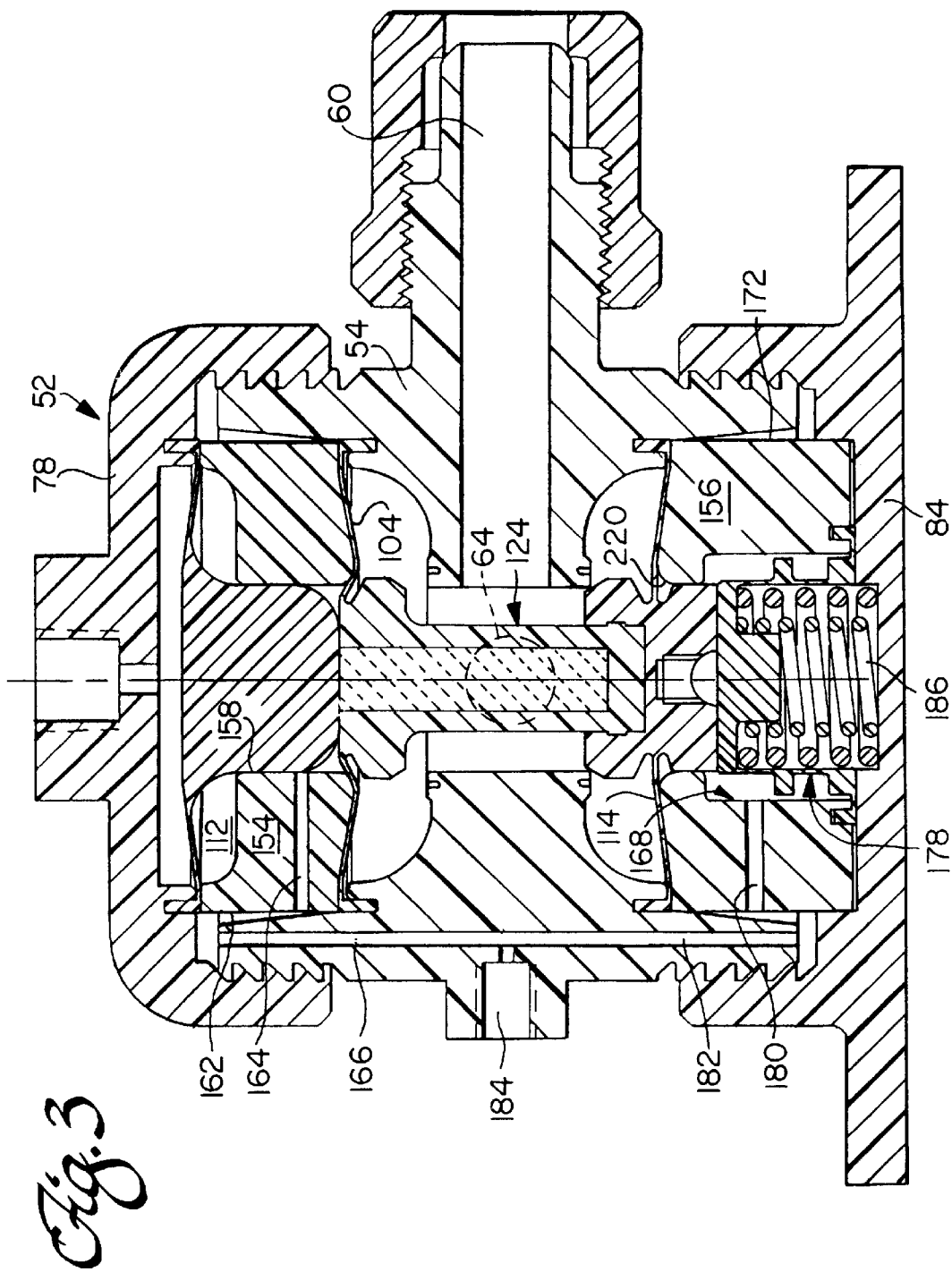
FIG. 3 is a semi-schematic, cross-sectional side view of the valve assembly of the present invention taken along line 3—3 of FIG. 2.

Referring to FIGS. 2 and 3, there are shown semi-schematic, cross-sectional side views of a preferred embodiment of a valve assembly 52 provided in accordance with practice of the present invention. (The positioning and orientation of the components of the valve assembly 52 relative to each other is described below as they are shown in the drawings.) The valve assembly includes a valve body 54 which is generally cylindrical in shape, and which has a top end portion 56 and a bottom end portion 58. As is best seen in FIG. 3 (and in phantom lines in FIG. 2), a fluid inlet passage 60 is through the side of the valve body 54 at a first location. Returning to FIG. 2, a first fluid outlet passage 62 is through the side of the valve body at a second location, and a second fluid outlet passage 64 is through the side of the valve body at a third location. The inlet 60 and the first and second outlets 62 and 64 are spaced radially apart from each other around the periphery of the valve body and enter the valve body at about the center of its height. In the illustrated embodiment, the first and second outlets are on opposite sides of the valve body, and the inlet is between the two outlets spaced equally from both. Other spacings and positions of the inlets and outlets can be used, if desired. Fittings 66 are provided on the inlet and first and second outlets for connection of piping or tubing for carrying liquids to and away from the valve.

The inlet passage 60 empties into a vertically extending cylindrical chamber 68 located in a central region of the valve body. An upwardly facing, generally cup-shaped upper chamber 70 is located above the cylindrical chamber 68, and a downwardly extending, generally cup-shaped lower chamber 72 is below the cylindrical chamber. The upwardly and downwardly facing chambers 70 and 72 are essentially identical.

An upwardly facing valve seat 74 is in the valve body 54 at the top of the cylindrical chamber 68 and between the inlet passage 60 and the first outlet passage 62. A downwardly facing valve seat 76 is in the valve body 54 at the bottom of the cylindrical chamber 68 and between the inlet passage 60 and the second outlet passage 64.

A cap 78 is removably mounted on the top of the valve body 54 by means of internal threads 80 which mate with threads 82 on the outside surface of the valve body. A base 84 is similarly removably mounted on the bottom of the valve body by means of internal threads 86 which mate with threads 88 on the outside surface of the valve body.

The valve body 54, cap 78, and base 84 are preferably molded of an inert material, such as Teflon® PFA or Teflon® FEP, which are provided by DuPont Company of Wilmington, Del. Such materials are not damaged by corrosive, acidic, or caustic liquids and do not introduce contamination into chemically pure liquids. If desired, the valve body, cap, and base may be made from other materials, such as metals or various polymers, and the surfaces that contact liquids flowing through the valve are coated with an inert material, such as a fluoropolymer.

The operating mechanism incorporated in the valve assembly 52 includes a first flexible, imperforate circular diaphragm 90 mounted on the inside of the cap. The first diaphragm incorporates an upwardly extending flange 92 around its outer peripheral edge and a cylindrical plug 94 which extends downwardly from its center. An annular groove 96 is around the inside bottom surface 98 of the cap 78 and the diaphragm 90 is mounted on the cap by means of the diaphragm flange 92 being press fit into the cap groove 96. A space 100 is defined between an upper surface 90a of the diaphragm 90 and the inner surface 98 of the cap for accommodating an actuating fluid, i.e., a pneumatic or hydraulic fluid or the like, which operates on the diaphragm. A port 102 is through the center of the cap 78 into the space 100 to allow entry and egress of the actuating fluid.

A second flexible, imperforate circular diaphragm 104 is mounted across an upper portion of the valve body above the upwardly facing valve seat 74. The second diaphragm 104 incorporates a downwardly extending flange 106 around its peripheral edge. An inside surface of the distal region 70a of the upwardly facing valve body chamber 70 has an outward taper, i.e., the inside diameter of the distal region 70a of the valve body becomes larger as you move toward the top of the valve. An upwardly facing annular groove 110 is in the valve body around the base of the taper. The second diaphragm 104 is mounted in the valve body by means of the downwardly extending second diaphragm flange 106 being press fit in the upwardly facing annular groove 110. The second diaphragm is spaced below the first diaphragm and forms an upper barrier for fluid which flows through the valve. The space 112 between the first and second diaphragms forms an upper chamber for containing fluid which may leak from the system through the second diaphragm.

A third flexible, imperforate circular diaphragm 114 is mounted across a lower portion of the valve body below the downwardly facing valve seat 76. The third diaphragm incorporates an upwardly extending flange 116 around its peripheral edge. An inside surface of the distal region 72a of the downwardly facing valve body chamber 72 incorporates an outward taper, i.e., the inside diameter of the distal region 72a valve body becomes larger as you move toward the bottom of the valve. A downwardly facing annular groove 120 is around the base of the taper.

The third diaphragm is mounted in the valve body by means of the upwardly extending third diaphragm flange 116 being press fit in the downwardly facing annular groove 120. The third diaphragm 114 forms a lower barrier for fluid flowing through the valve, and the space 122 between the third diaphragm and the inner surface of the base forms a lower chamber for containing fluid which may leak from the system through the third diaphragm.

A poppet assembly 124 is in contact with the second diaphragm 104 and is connected to the third diaphragm 114, and moves with the diaphragms. The poppet assembly 124 comprises a lower valve plug 126, an upper valve plug 128, and a stem 130 connecting the valve plugs together. The lower valve plug 126 is integral with an upwardly facing surface 114a of the third diaphragm and is configured to engage the downwardly facing valve seat 76, to thereby stop the flow of fluids from the inlet 60 through the second outlet passage 64. The lower valve plug includes a guide 132 that is integral with a downwardly facing surface of the third diaphragm 114, and that projects axially outward a distance therefrom. The upper valve plug 128 is integral with downwardly facing surface 104a of the second diaphragm 104, and is configured to engage the upwardly facing valve seat 74, to thereby stop the flow of fluids from the inlet 60 through the first outlet passage 62. In a preferred embodiment, annular grooves 134 and 136 are around the base of the valve plugs 128 and 126, respectively, between the plugs and the associated diaphragms. The valve stem 130, which has one end integrally formed with one of the upper or lower valve plugs, extends through the center portion of the valve body, i.e., through the cylindrical chamber 68. The other end of the valve stem is removably connected to the other valve plug, wherein the connection forms a fluid-tight seal between the valve stem and the plug. In the illustrated embodiment, the valve stem 130 has its upper end integrally formed with the upper valve plug 128, and the lower end of the valve stem is removably connected to the lower valve plug 126.

The first, second, and third diaphragms are preferably formed of an inert materials, such as Teflon® PFA, Teflon® PTFE, or Teflon® FEP. The diaphragms and their associated components, for example, the upper diaphragm and associated valve plug and stem, and the lower diaphragm and associated valve plug, can be fabricated by machining, if desired. Other operations such as molding can also be used.

Vertically extending bores 138 and 140, which are in registry with each other, are respectively through the center of the upper valve plug 128 and along the center of the length of the valve stem 130. The valve stem is imperforate in that it is closed at a distal end 142 that connects the valve stem to the lower valve plug 126. Accordingly, the bore 140 extends only partially through the valve stem 130, which reduces a potential liquid leak path through the valve. The bore 140 is designed to accommodate placement of a insert shaft 143 therein. The insert shaft 143 is used to provide a desired degree of axial rigidity to the otherwise polymeric valve stem 130. The insert shaft can be formed from such inert materials as ceramics and the like that will not pose a contamination threat to high purity chemical process liquids, and that have a desired degree of structural rigidity. In a preferred embodiment, the insert shaft is formed from quartz. Although described and illustrated, valve stems of this invention can alternatively be formed without such bore 140 and insert shaft 142, in the event that a solid valve stem provides a sufficient degree of rigidity.

The outside surface of the valve stem distal end 142 includes a radially projecting ridge 144 that extends circumferentially therearound. The lower valve plug 126 includes a stem opening 146 disposed within an upwardly facing surface that is sized to accommodate placement of the valve stem distal end 142 therein. The stem opening 146 extends axially a partial distance through the lower valve plug, and does not extend completely therethrough, i.e., the lower valve plug is imperforate. The stem opening 146 includes a groove 148 that is disposed radially within a wall surface and that extends circumferentially therearound. The groove 148 is sized to accommodate placement of the valve stem projecting ridge 144 therein to provide a releasible snap attachment between the valve stem 130 and the lower valve plug 126 to firmly hold the stem and lower valve plug together. In a preferred embodiment, the attachment formed between the distal stem end 142 and the low valve plug stem opening 146 forms a leak-tight seal with a zero liquid holdup up volume therebetween.

The lower valve plug guide 132 includes a opening 150 disposed axially a partial depth from a downwardly facing surface that is threaded to accommodate placement of a threaded member (not shown), such as a screw, bolt and the like therein. The opening 150 is designed so that a thin wall 152 exists between it and the stem opening 146 disposed within the opposite end of the lower valve plug 126. Use of the threaded member within the opening is designed to cause the thin wall 152 to deflect upwardly towards and against the distal end of the valve stem a sufficient degree to release the valve stem end 142 from the opening 146 after the valve has been assembled. This feature allows one to release the valve stem from the lower valve plug in a relatively easy manner to permit field maintenance and repair.

Annular backup rings 154 and 156 are mounted in the upper and lower fluid containment chambers. The upper chamber backup ring 154 has a vertical hole or bore 158 through its center defining an inner peripheral surface and a generally vertically extending cylindrical outer surface 162. As best shown in FIG. 3, a horizontal passage or bore 164 is through the upper backup ring 154 from its inside peripheral surface 158 to its cylindrical outside surface 162 for passage of any fluids which may leak into the chamber through the second diaphragm 104. The outer peripheral portion of the backup ring 154 extends between the flanges 92 and 106 of the first and second diaphragms for securely holding the first diaphragm flange 92 in the cap groove 96 and the second diaphragm flange 106 in the body groove 110, respectively.

As is shown in FIG. 3, a generally vertical leak detection passage or bore 166 extends from the region of the upper containment chamber 112 surrounding the cylindrical outside surface 162 of the backup ring through the valve body to the exterior surface of the valve body for the passage of fluids which may leak through the second diaphragm and into the upper containment chamber.

Referring to FIG. 2, the lower containment chamber backup ring 156 has a vertically hole or bore 168 through its center defining an inner peripheral surface and a generally vertical extending cylindrical outer surface 172. The inner peripheral surface 168 includes, moving downwardly towards the base, a first diameter section 174 that extends axially a distance from a frontside surface of the lower containment chamber backup ring, and an enlarged second diameter section 176 at extends axially to a backside surface of the lower containment chamber backup ring. The first diameter section 174 is sized to both accommodate placement and guide axial displacement of the lower valve plug guide 132 therein. As will be discussed in greater detail below, the second enlarged diameter section 176 is sized to accommodate placement of a spring containment body 178 therein.

As is shown in FIG. 3, a horizontal passage or bore 180 is through the lower backup ring from its bore 168 to its cylindrical outside surface 172 for passage of any fluids which may leak into the lower containment chamber through the third diaphragm. A generally vertical leak detection passage or bore 182 extends from the region of the lower containment chamber surrounding the cylindrical outside surface 172 of the backup ring 156 vertically through the valve body to the exterior surface of the valve body for the passage of fluids which may leak through the third diaphragm and into the lower containment chamber. In the illustrated embodiment, the leak detection passage 166, which extends from the region of the upper containment chamber, and the leak detection passage 182, which extends from the lower containment chamber, flow together and exit the valve body through the leak detection port 184.

Systems can be provided to sound an alarm or the like in the event that a leak is detected so that appropriate corrective measures can be taken. Such corrective measures can be, for example, to shut down other components of the system in which the valve is being used, or to actuate the valve to change its position, or other actions as appropriate. The corrective actions can be manual or automatic. Leak detection can be by visual means or sensors can be used. For example, an optical, resistance, ultrasonic, or capacitive-type leak detector sensor can be mounted directly in the leak detection port 184, if desired.

The upper and lower backup rings can be molded or otherwise formed, such as by machining, of inert materials, such as Teflon® PFA, Teflon® PTFE, or Teflon® FEP. Other relatively inert polymeric materials, such as polypropylene, may also be used.

Referring to FIG. 2, spring means 186 are mounted in the space between the third diaphragm 114 and the base 84 for biasing the poppet assembly 124 and connected second and third diaphragms in an upwardly direction for engaging the lower valve plug 126 with the downwardly facing valve seat 76 to thereby stop the flow of fluids from the inlet 60 through the second outlet passage 64 while, at the same time, disengaging the upper valve plug 128 from the upwardly facing valve seat 74 to allow for flow of fluids from the inlet 60 to the first outlet passage 62.

In a preferred embodiment the spring means 186 is in the form of a pair of coil springs mounted in the vertically extending lower backup ring bore 168, within the second enlarged diameter section 176. A first one of the springs 188 have a diameter larger than the other spring 190, and the small diameter spring is nested within the larger diameter spring. A bottom end of the springs are disposed a distance within a recessed section 192 of the base 84. In an exemplary embodiment, the small diameter spring 190 is coiled in one direction and the large diameter spring 188 is coiled in the opposite direction to eliminate interference problems. The small and large diameter springs are preferably metal, coated with Teflon® or other fluoropolymer material.

The springs are disposed within a chamber 194 of the spring containment body 178, which body is disposed within the second enlarged diameter section 176 of the lower backup ring bore 180. The spring containment body chamber 194 is generally cylindrical in shape and is sized to completely encapsulate the springs therein to isolate the springs from any liquid that has leaked past the third diaphragm 114. Moving radially inwardly from an outermost peripheral edge, the body 178 comprises an upwardly projecting tongue 196 that extends in a circular manner and defines a peripheral edge of the body. The tongue 196 is sized to form an interference fit within a groove 198 disposed within a backside surface 200 of the lower backup ring 156.

The spring containment body 178 comprises a cylindrical sleeve 202 that extends axially away from the tongue 196, and that defines a wall surface of the spring chamber 194. It is desired that the sleeve 202 have a thin wall construction to allow it to be axially compressed and expanded with the respective axial compression and expansion of the springs. In a preferred embodiment, the sleeve 202 has a thin wall construction that is adapted to form bellows in response to the compression movement of the springs and the spring containment body when installed within the valve. In an example embodiment, where the diameter measured across the body tongue is approximately 30 millimeters, it is desired that the sleeve have a wall thickness in the range of from about 0.12 to 1.5 millimeters, and more preferably approximately 0.25 millimeters.

The sleeve 202 is designed to form one or more bellows during such compression movement by providing one or more integral circumferential ridges along the sleeve length. In a preferred embodiment, the sleeve includes a first ridge 204 disposed along a base of the body near the tongue 196, and a second ridge 206 disposed midway along the sleeve length, to cause the sleeve to form two bellows during axial compression. The second ridge 206 is also designed having an outer diameter that is slightly smaller than that of the second enlarged diameter section 176 of the lower backup ring bore 168 to guide the sleeve 202 along the second enlarged diameter section 176 during its axial displacement. In an example embodiment, such as the one set forth above, it is desired that the second ridge 206 have an axial length of approximately 1.8 millimeters, and a radial width of approximately 2.8 millimeters.

Extending radially inwardly from the sleeve 202, the spring containment body 178 includes a closed end 208 that is disposed over the top end of the springs. The closed end 208 has a planar frontside surface 210 that is positioned adjacent and in contact with a downwardly directed surface 212 of the lower valve plug guide 132. The closed end 208 has a backside surface that includes an axially projecting portion 214 that is sized to fit within a diameter of the small diameter spring 190, to align the small and large diameter springs axially within the spring containment body chamber 178. The springs bias the poppet assembly 124, and connected second and third diaphragms, in an upward direction for engaging the lower valve plug 126 with the downwardly facing valve seat 76.

The spring containment body 178 is preferably formed of an inert material, such as Teflon® PFA or Teflon® FEP. The spring containment body can be fabricated by machining, if desired. Other operations such as molding can also be used.

Figure 4:
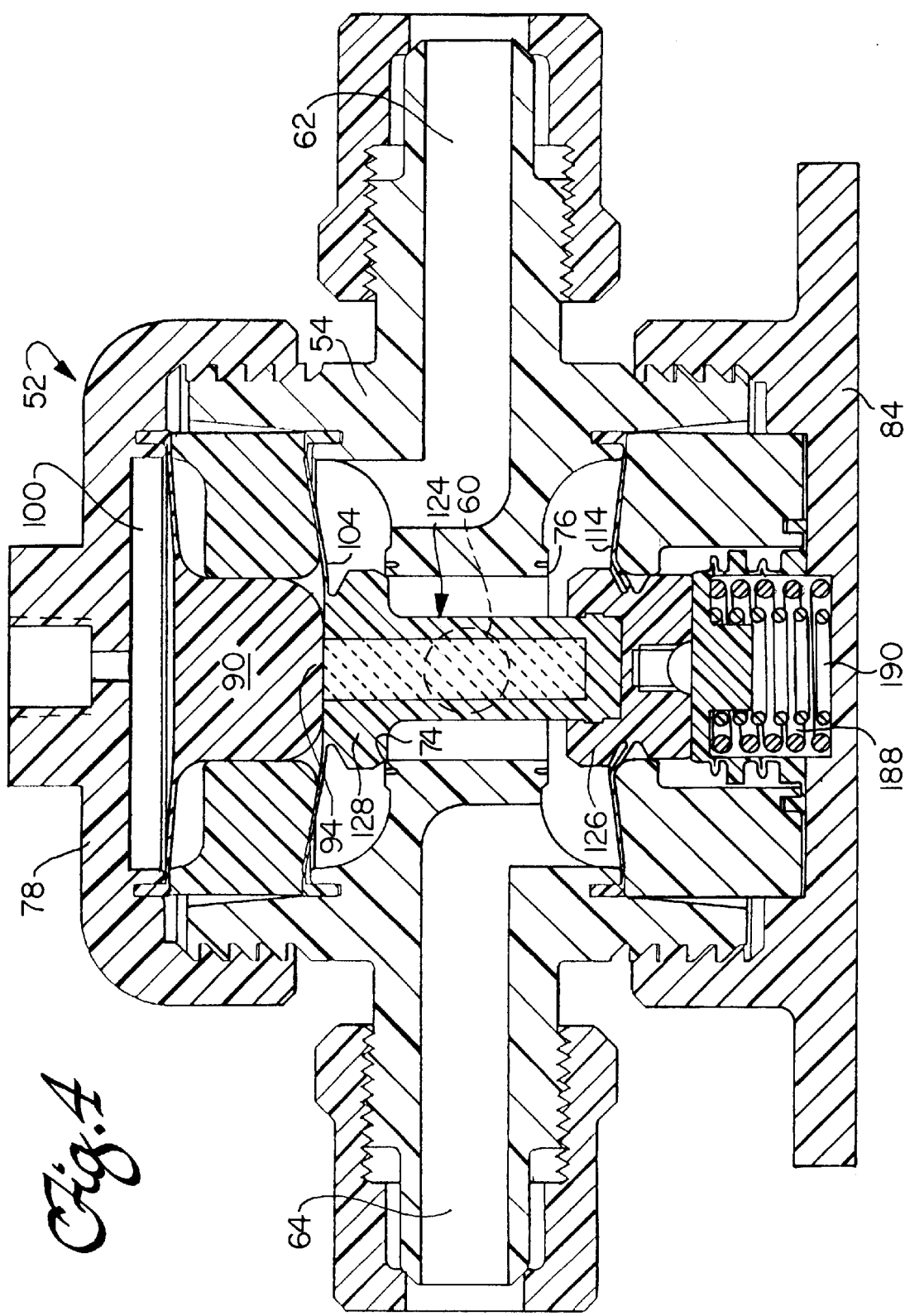
FIG. 4 is a semi-schematic, cross-sectional side view of the valve assembly shown in FIG. 2 in a second operating condition.

When it is desired to stop the flow of fluids from the inlet 60 through the first outlet passage 62, pneumatic pressure or hydraulic pressure or the like is introduced through the port 102 in the valve cap 78 into the space 100 between the first diaphragm 90 and the inner surface 98 of the cap. Referring to FIG. 4, upon entry of the actuating fluid into the space 100, the fluid pressure acts on the diaphragm 90 to force the diaphragm and plug 94 down, pushing the poppet assembly 124 and connected second and third diaphragms 104 and 114, respectively, in a downwardly direction against the force of the springs 188 and 190. This results in the upper valve plug 128 engaging the upwardly facing valve seat 74 to stop the flow of fluids from the inlet 60 through the first outlet passage 62, while, at the same time, the lower valve plug 126 disengages from the downwardly facing valve seat 76 to allow for flow of fluids from the inlet 60 through the second outlet passage 64.

A key feature of the valve assembly 52 of the present invention is the unique design of the valve seats 74 and 76, which facilitates the tight seal made between the seat and valve plug when the two are engaged. Since the seats 74 and 76 are constructed identically, only one will be described below. As can be seen by referring to FIG. 2 for example, the valve seat 74 comprises a circular edge 216 of the vertically extending cylindrical chamber 68, and a groove 218 disposed concentrically around the circular edge 216. The use of such groove 218 around the circular edge of the valve seat is designed to produce a desired degree of valve seat resilience (i.e., enable the valve seat to flex outwardly) when contacted by a respective valve plug to both provide an enhanced leak-tight seal therebetween, and continue to provide such desired leak-tight performance after repeated valve cycling without the risk of valve seat damage or fatigue. In an example embodiment, where the cylindrical chamber 68 has a diameter of approximately 19 millimeter and the valve body and the valve seat 74 are machined of polytetrafluoroethylene (PTFE), the groove 218 is positioned radially approximately 1 millimeter away from the circular edge, has a radial width of approximately 0.4 millimeters, and has an axial depth of approximately 1.3 millimeters.

Another key feature of the valve assembly 52 of the present invention is the design of the valve stem 130 and the attachment of the lower valve plug 126 thereto. In an effort to minimize potential leak paths through the valve, through which liquid leaking past the second or third diaphragms could pass to other non-wetted areas of the valve or to the environment, the valve stem 130 has been designed having a bore 140 that extends only partially therethrough (i.e., is imperforate), and having a distal end 142 adapted to form a snap-type releasable attachment with the lower valve plug 126 without the use of a bolt extending therethrough. The elimination of such bolt connection extending between communicating bores of the valve stem and the lower valve plug both eliminates a potential leak path through the valve stem and, thereby minimizes the risk of leaking liquid leaving the valve or traveling to non-wetted areas of the valve, and minimizes the potential for metallic contamination of high purity chemical process liquid.

A still other key feature of the valve assembly of the present invention is the design of the spring containment body 178 that completely encapsulates springs 188 and 190 from liquid leaking past the third diaphragm in the event of a diaphragm failure. The design of isolating the springs from such leaking liquid minimizes or even eliminates the potential for metallic contamination of high-purity chemical process liquid via such leakage.

Another feature of the design of the valve assembly 52 of the present invention is that the spring force required to move the valve plug 126 against the seat 76 to close the valve is minimized. Minimizing the spring force is accomplished, in part, by providing the lower backup ring 156, which engages a selected portion of an annular peripheral segment of the downwardly facing surface 114*a* of the diaphragm 114. When the lower valve plug 126 is disengaged from the seat 76, as is the case when the valve is in the condition shown in FIG. 4, the pressure of the fluid flowing through the valve from the inlet 60 through the outlet 64 acts on the diaphragm 114 However, the downward force generated by the fluid equals only the fluid pressure times the area of the diaphragm that is not in contact with the backup ring. This minimizes the downwardly directed force opposing the spring force, thereby reducing the force required to close the valve upon the release of the actuating fluid pressure in the space 100.

The provision of the backup ring 156 also minimizes the spring force required to maintain the valve plug 126 seated in the valve seat 76 against any back pressure from the outlet 64. For example, when the valve assembly 52 is in the condition shown in FIG. 2, back pressure from the outlet 64 acts on the diaphragm 114, tending to disengage the valve plug 126 from the valve seat 76, which would result in leakage. However, as was described above with regard to the minimized spring force for closing the valve plug against the seat 76, the downward force generated by the fluid equals only the outlet line back pressure times the area of the diaphragm that is not in contact with the backup ring 156. This minimizes the downwardly directed force which operates against the spring force and results in minimizing the size of the spring required to maintain the valve plug 126 seated against back pressure.

A still other feature of the valve assembly of the present invention is that the height of the valve taken up by the spring is minimized while optimizing the uniformity of the spring force. This advantage is accomplished by providing the two nested springs instead of a single spring. If a single spring, having the same spring force as the combined force of the nested springs and having the same height as the nested springs, was used, the single spring would not provide as constant a spring force in the operating range as is provided by the nested springs. In order to obtain the same constancy of spring force with a single spring that is provided by the nested springs, the height of the single spring would have to be substantially more than the height of the nested springs. This would require that the valve be larger, which is a disadvantage.

Still another feature of the valve assembly 52 of the present invention is the provision of diaphragms which, instead of being stretched tight when mounted in the valve in a horizontal plane, have a pre-designed amount of slack in their surface. In one exemplary embodiment, the diameter of the second and third diaphragms, when stretched tight, is 1.965 inches. The tapers 108 and 118 of the outer walls of the upper and lower valve chambers 70 and 72, respectively, are approximately 4°. In this embodiment, the diameter of the upper and lower chambers 70 and 72, respectively, at their top- and bottom-most elevations, i.e., at their openings, is 2.030 inches, while the diameters of the upper and lower chamber grooves 110 and 120 in which the diaphragm flanges 106 and 116 are seated are only 1.955 inches.

Having the openings of the valve chambers larger in diameter than the diameter of the diaphragms provides for ease of mounting the diaphragms in the chamber grooves while, in so doing, the diaphragms are compressed radially inwardly so that their surfaces are slack. Mounting the diaphragms is accomplished by sliding each diaphragm along its respective tapered chamber wall while compressing the diaphragm radially inwardly until the diaphragm flange is securely mounted in the associated groove. Because the diaphragm surfaces are not tight, movement of the diaphragms, either upwardly or downwardly, is accommodated, at least in part, by the slack, in the diaphragm surface. This reduces the stress on the diaphragm as it cycles with the poppet assembly, thereby increasing diaphragm life.

Still another feature of the present invention which further reduces the stress on the diaphragms as the valve cycles is the provision of the V-shaped grooves 134 and 136 around the base of each valve plug between the plug and the diaphragm. In an exemplary embodiment, a diaphragm is provided which has a thickness of approximately 0.33 millimeters and a preinstalled diameter of 50 millimeters. The diameter of the valve plug at the center of its height is approximately 20 millimeters, while the plug diameter at the point of connection to the diaphragm is approximately 15 millimeters. The grooves are approximately V-shaped (when the diaphragm is in a horizontal plane), and the angle of the V is approximately 27°, while the apex of the V is defined by a circular radius of 0.5 millimeters. As can be seen by referring to FIGS. 3 and 5, instead of stretching the diaphragm when the poppet is moved, the diaphragm material which forms the base of the V simply collapses toward or opens away from the base of the valve plug. This action reduces the stretching or stress on the diaphragm during its cycling, thereby increasing the number of cycles that the valve can undergo without diaphragm failure.

The simplicity of construction of the valve of the present invention makes it easy to change the pressure of the actuating fluid that is required to operate the valve and to change the back pressure which can be withstood without resulting in inadvertent valve opening or leakage. For example, the area of the surface of the backup ring that is in contact with the diaphragm can simply be changed to allow more or less force to be generated by the system fluids in a downward direction against spring force or in an upward direction with spring force. Referring, for example, to FIG. 3, one simple design change which results in changing the forces exerted on the diaphragm 114 can be to change the radius of curvature of the lip 220 of the backup ring 156, the lip 220 being that portion of the backup ring surface that is not in contact with the diaphragm and transitions to the vertically extending inner peripheral surface of the vertical bore 168. For example, all other things being constant, when the valve assembly 52 is in the condition shown in FIG. 2 having a larger radius of curvature of the backup ring lip 220 results in a larger downwardly directed force generated by the back pressure from the outlet 64 than would be generated if the lip is of a smaller radius. This is so because, with the larger radius, less diaphragm surface area would be contacted by the backup ring compared to the diaphragm surface area contacted with a smaller radius lip. Referring to FIG. 3, if the radius of the backup ring lip 220 were made smaller, a higher back pressure could be withstood by the springs while maintaining the valve plug 126 on the valve seat 76. Conversely, if the radius of curvature were made larger, less back pressure could be withstood. In an exemplary embodiment of the valve assembly 52 of the present invention, the radius of curvature of the lower backup ring 156 is 0.093 inch, with the angle of the backup ring surface contacting the diaphragm surface being 12° from horizontal.

Yet another feature of the valve assembly 52 provided in accordance with the present invention is that the valve can be completely disassembled, yet no added O-ring seals or the like are required to preclude leakage of fluid from the system into the lower containment chamber 122. The capability to disassemble the valve while eliminating the requirement for extra seals is the result of providing that the connection between the valve stem 130 and lower valve plug 126 be releasable, as discussed above. Instead, the connection can be repeatedly made and then broken as the valve is assembled and disassembled.

Figure 5:
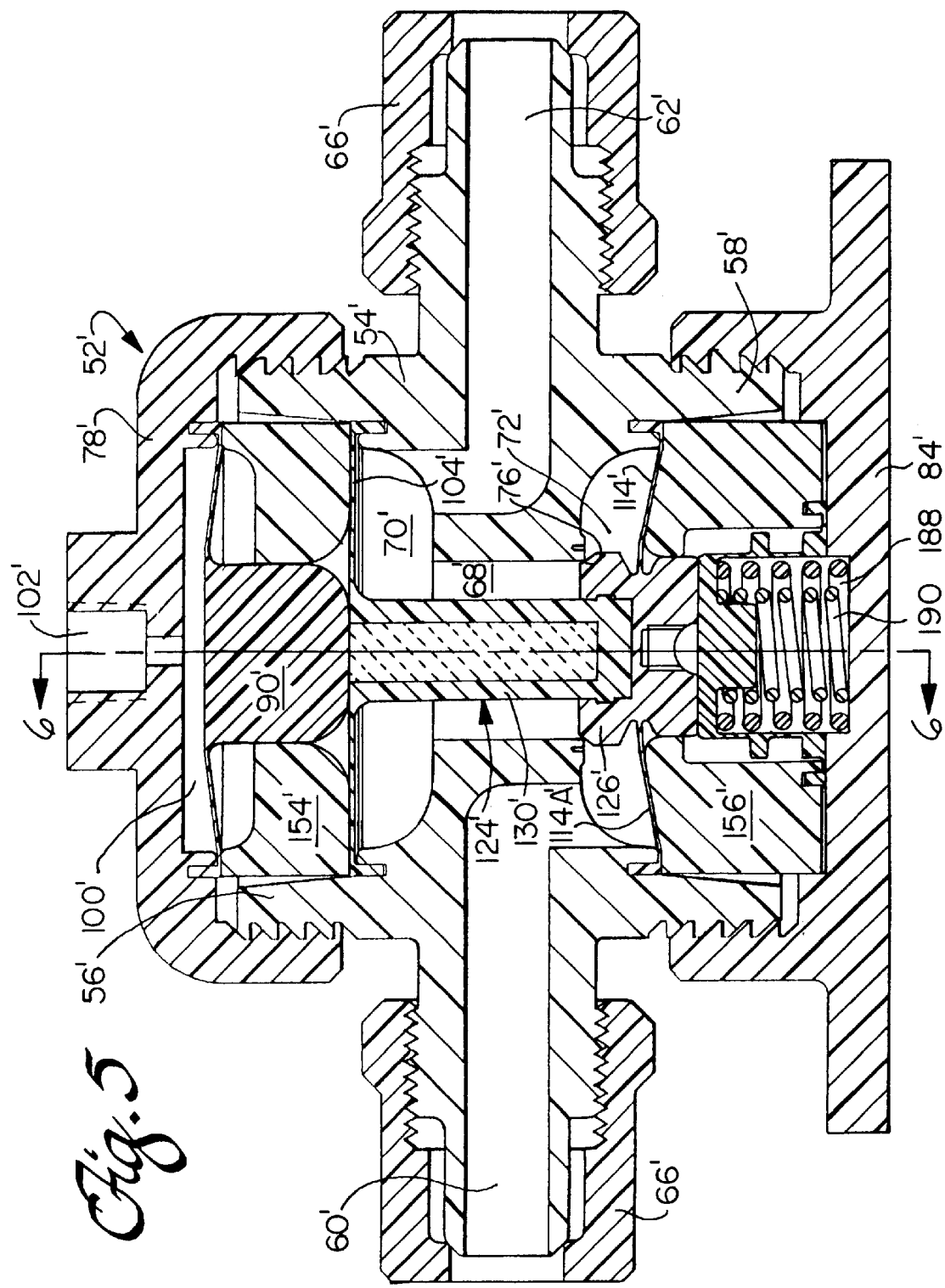
FIG. 5 is a semi-schematic, cross-sectional side view of a second embodiment of the valve assembly provided in accordance with practice of the present invention shown in its normally closed condition.
Figure 6:
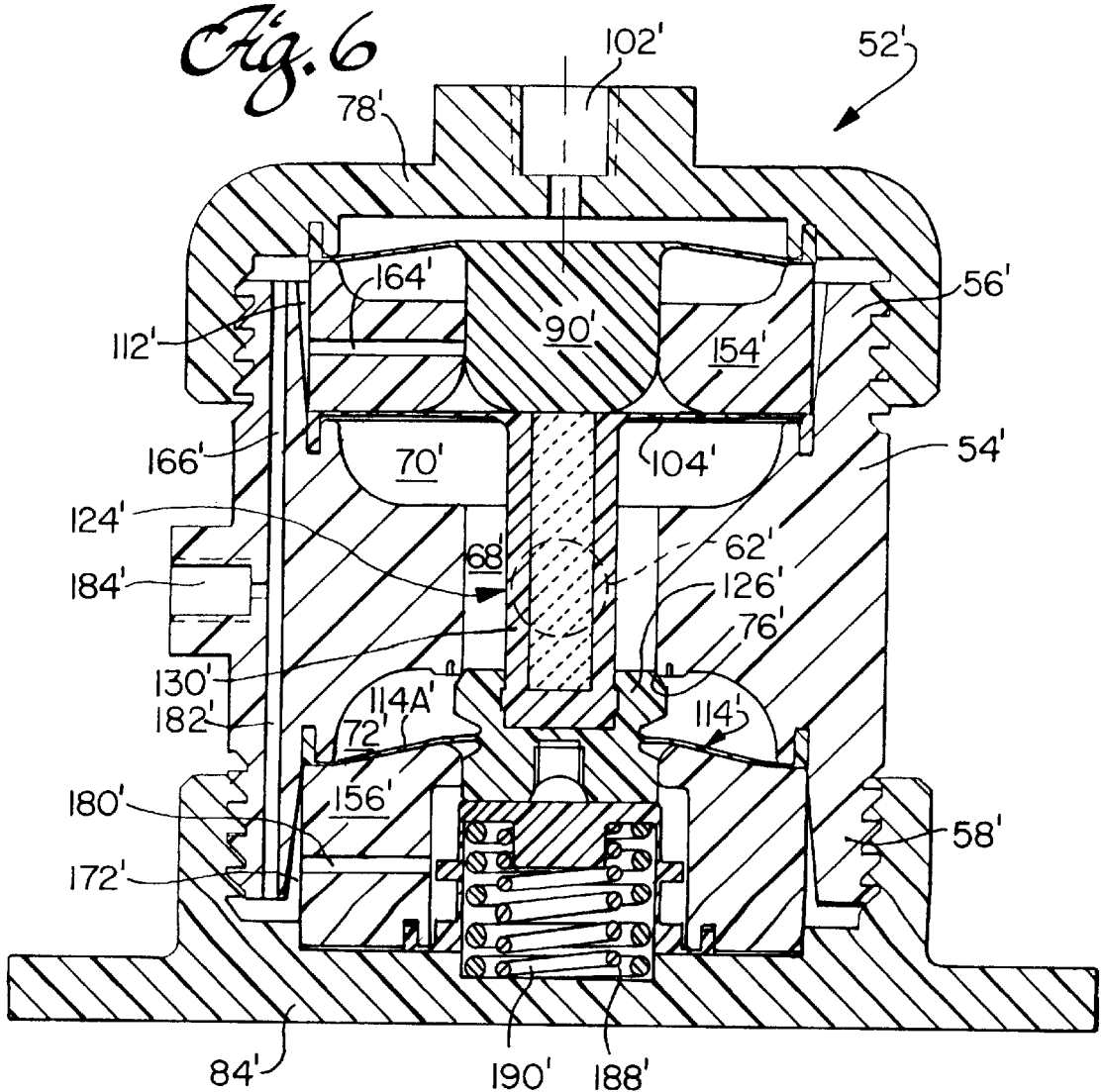
FIG. 6 is a semi-schematic, cross-sectional side view of the valve assembly of the present invention taken along line 6—6 of FIG. 5.

Referring to FIGS. 5 and 6, there are shown semi-schematic, cross-sectional side views of a second preferred embodiment of a valve assembly provided in accordance with practice of the present invention. The components of the valve assembly shown in FIGS. 5 and 6, which are similar to the components identified with reference to FIGS. 2 to 4, have the same reference numerals but with a prime (') designation. The valve assembly 52' of this embodiment incorporates essentially the same components as the components of the embodiments shown in FIGS. 2 to 4, except the embodiment of FIGS. 5 and 6 is a two-way valve with a single inlet and outlet, and only a single valve plug is provided.

The valve assembly 52' includes a valve body 54' which has a top end portion 56' and a bottom end portion 58'. A fluid inlet passage 60' is through the side of the valve body 54' at a first location. A fluid outlet passage 62' is through the side of the valve body at a second location which is spaced apart radially from the first location. In the illustrated embodiment, the inlet and outlet are on opposite sides of the valve body. Fittings 66' are provided on the inlet and outlet for connection of piping or tubing for carrying liquids to and away from the valve.

The inlet passage 60' empties into a vertically extending cylindrical chamber 68' located in a central region of the valve body. An upwardly facing, generally cup-shaped upper chamber 70' is located above the cylindrical chamber 68', and a downwardly extending, generally cup-shaped lower chamber 72' is below the cylindrical chamber.

A downwardly facing valve seat 76' is in the valve body 54' at the bottom of the cylindrical chamber 68' and between the inlet passage 60' and the outlet passage 62'.

A cap 78' is removably mounted on the top of the valve body 54', and a base 84' is similarly removably mounted on the bottom of the valve body. The operating mechanism of the valve assembly 52' includes a first flexible, imperforate circular diaphragm 90' which is mounted on the inside of the cap 78' in a similar manner as the mounting of the diaphragm to the cap as shown in FIGS. 2 to 4. A port 102' is through the center of the cap 78' to allow entry and egress of an actuating fluid into the space 100' between the cap and the diaphragm.

A second flexible, imperforate circular diaphragm 104' is mounted across an upper portion of the valve body. The second diaphragm is mounted in the valve body similarly to the mounting of the second diaphragm to the valve body as shown in FIGS. 2 to 4. A third flexible, imperforate circular diaphragm 114' is mounted across a lower portion of the valve body below the downwardly facing valve seat 76'. The third diaphragm is mounted in the valve body in a similar manner as the third diaphragm was mounted in the valve body shown in FIGS. 2 to 4.

The poppet assembly 124' is similar to the poppet assembly of FIGS. 2 to 4, with the exception that no upper valve plug is provided but, instead, the stem 130' is connected directly to the downwardly facing surface of the second diaphragm. A lower valve plug 126' is integral with the upwardly facing surface 114a' of the third diaphragm and is configured to engage the downwardly facing valve seat 76' to thereby stop the flow of fluids from the inlet 60' through the outlet passage 62'.

Annular backup rings 154' and 156' are mounted in the upper and lower fluid containment chambers, respectively. As is shown in FIG. 6, a bore 164' extends horizontally through the upper backup ring 154', and a generally vertical leak detection passage or bore 166' extends from the region of the upper containment chamber 1 12' surrounding the backup ring through the valve body to the exterior surface of the valve body for the passage of fluids which may leak through the second diaphragm and into the upper containment chamber.

The annular backup ring 156' in the lower containment chamber incorporates a horizontal passage or bore 180' for passage of any fluids which may leak into the lower containment chamber through the third diaphragm 114'. A generally vertical leak detection passage or bore 182' extends from the region of the lower containment chamber surrounding the cylindrical outside surface 172' of the backup ring 156' vertically through the valve body to the exterior surface of the valve body for the passage of fluids which may leak through the third diaphragm and into the lower containment chamber. In the illustrated embodiment, the leak detection passage 166' extending from the region of the upper containment chamber and the leak detection passage 182' extending from the lower containment chamber flow together and exit the valve body through the leak detection port 184'.

In FIGS. 5 and 6, the valve is shown in a condition with the springs 188' and 190' biasing the valve plug 126' against the seat 76', to thereby stop the flow of fluids from the inlet 60' to the outlet 62'.

Figure 7:
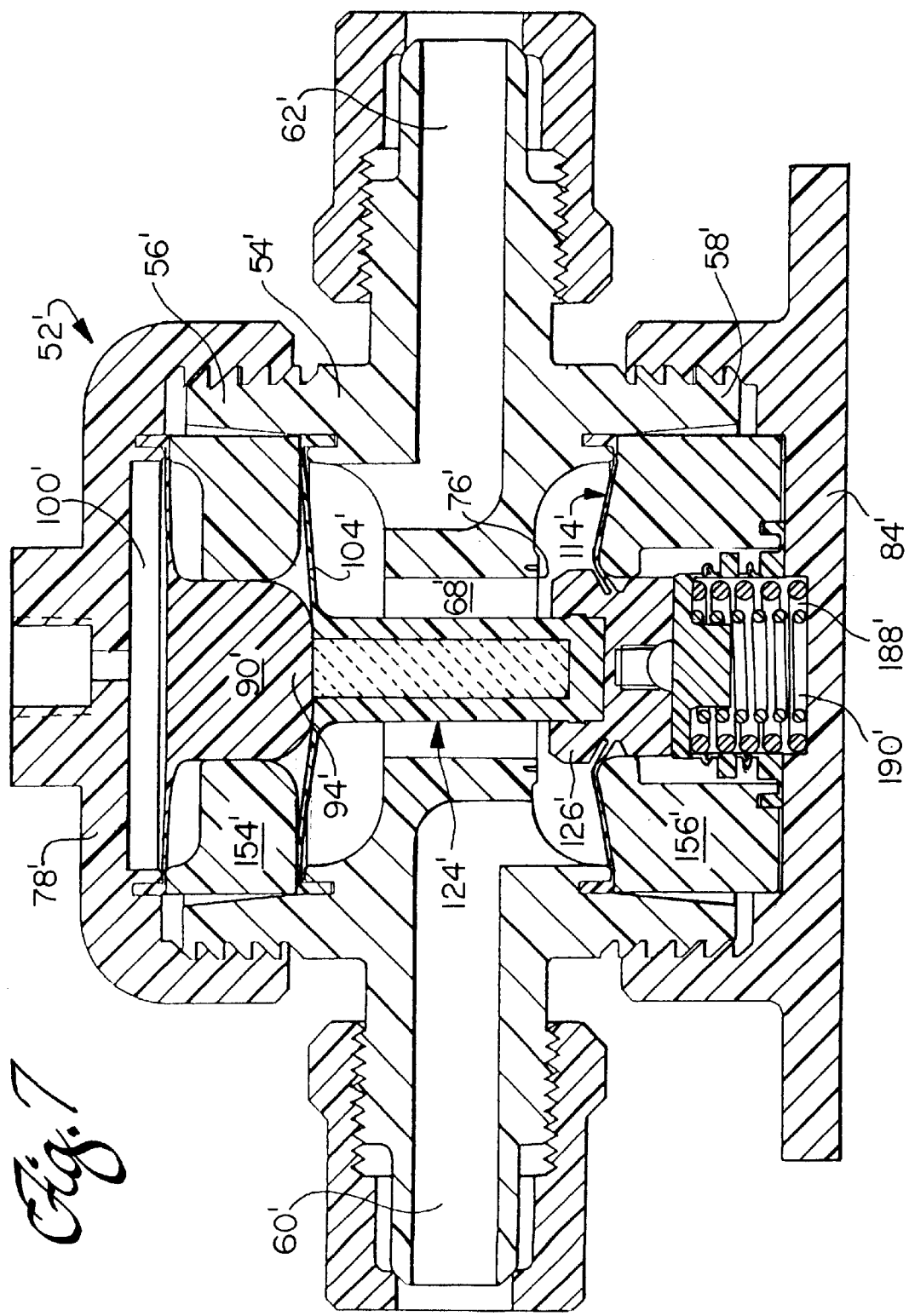
FIG. 7 is a semi-schematic, cross-sectional side view of the valve assembly shown in FIG. 5 in its normally open condition.

As can be seen to referring to FIG. 7, upon entry of the actuating fluid into the space 100', the fluid pressure acts on the diaphragm 90' to force the diaphragm 90' and associated plug 94' down, pushing the poppet assembly 124' and the connected second and third diaphragms in a downwardly direction against the force of the springs 188' and 190'. This results in the valve plug 126' disengaging the downwardly facing valve seat 76' to allow the flow of fluids from the inlet 60' through the outlet passage 62'.

Figure 8:
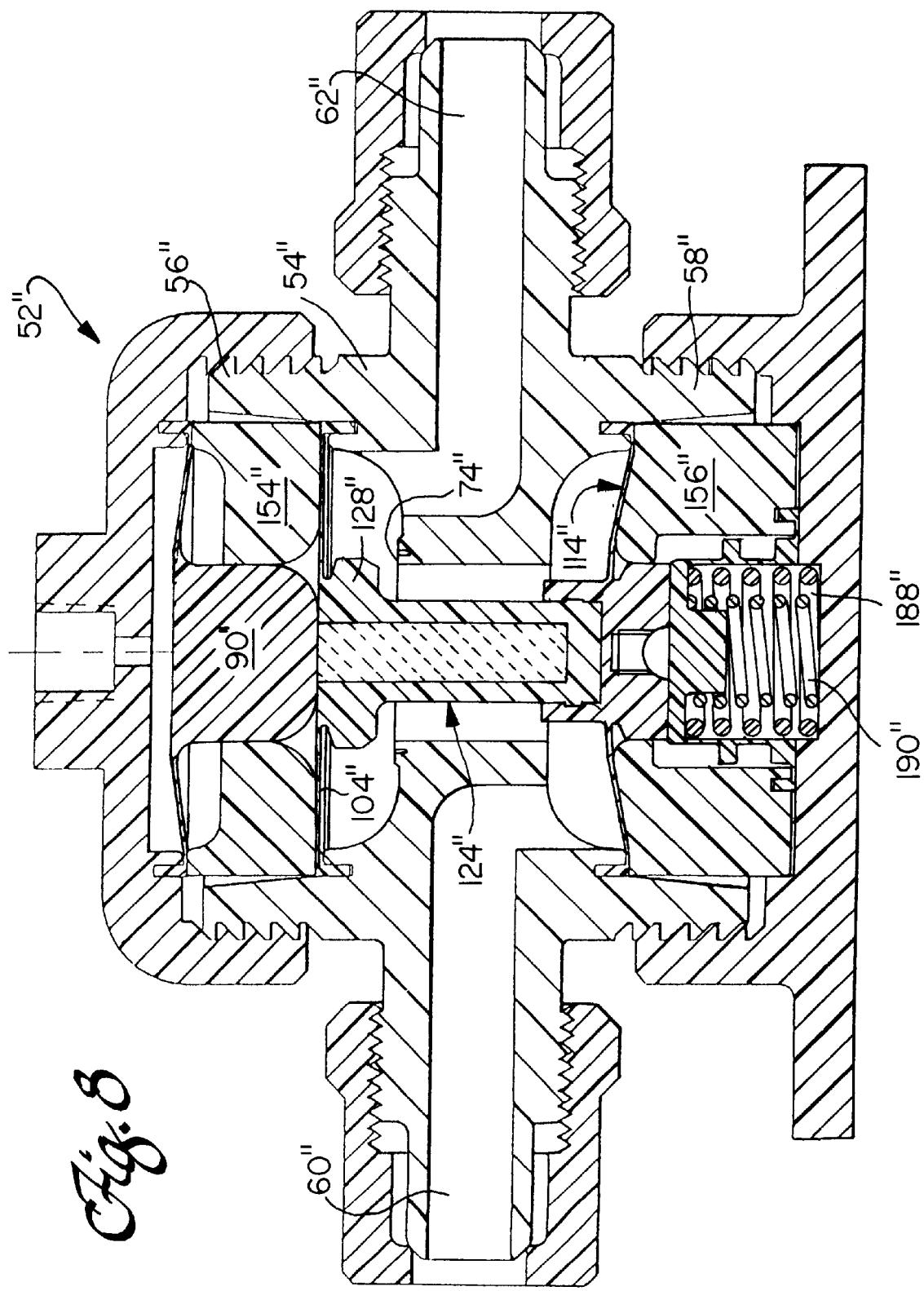
FIG. 8 is a semi-schematic, cross-sectional side view of another embodiment of the valve assembly provided in accordance with practice of the present invention shown in its normally open condition.

Referring to FIG. 8, yet another preferred embodiment of the valve assembly of the present invention is shown. Parts of the device of FIG. 8, which are similar to parts identified with reference to FIGS. 2 to 7 have the same reference numerals, with a double prime (") designation. The FIG. 8 embodiment is the same as the FIGS. 5 to 7 embodiment, with the exception that the poppet assembly 124" is reversed, i.e., the valve assembly 52" is in a normally open condition, wherein the valve plug 128" is biased away from the valve seat 74" by the springs 188" and 190".

The above description of preferred embodiments of the diaphragm valve of the present invention are for illustrative purposes. For example, the "three-way" valve described with reference to FIGS. 2 to 4 could use the port 60 as an outlet with the ports 62 and 64 functioning as inlets for two separate fluids. Because of variations which will be apparent to those skilled in the art, the present invention is not intended to be limited to the particular embodiments described above. The scope of the invention is defined in the following claims.

What is claimed is:

1. A valve assembly comprising:
   a valve body having a central chamber that extends therethrough, having a fluid inlet and a fluid outlet each disposed through wall portions of the valve body; and having an open top end and an open bottom end;
   a valve seat at an edge of the central chamber, wherein the valve body includes a groove disposed concentrically around the valve seat;
   a poppet assembly disposed within the valve body, the poppet assembly comprising:
      an imperforate valve stem disposed within the central chamber; and
      an imperforate valve plug having a recess, wherein the valve Plug is releasibly attached at the recess to one end of the valve stem to prevent possible migration of fluid therebetween, wherein the valve plug is positioned outside of the central chamber adjacent the valve seat;
   a cap attached to the valve body top end;
   a first flexible imperforate diaphragm disposed within the cap;
   a second flexible imperforate diaphragm disposed within the valve body between the poppet assembly and the first diaphragm, and connected to one end of the poppet assembly, wherein the second diaphragm forms a leak-tight seal with the valve body;
   a base attached to the valve body bottom end;
   a third flexible imperforate diaphragm disposed in the valve body between the poppet assembly and the base, and connected to an end of the poppet assembly opposite the second diaphragm, wherein the third diaphragm forms a leak-tight seal with the valve body; and
   spring means disposed between the base and the third diaphragm for imposing a biasing force onto the poppet assembly;
   wherein placement of the valve plug against the valve seat prevents liquid migration through the valve from the fluid inlet to the fluid outlet.

2. A valve assembly as claimed in claim 1 further comprising:
   a first annular backup ring disposed within the valve body between the first and second diaphragms, the first ring having a channel through it from an inside peripheral surface to an outside peripheral surface for passage of any fluids which may leak between the first and second diaphragms; and
   a second annular backup ring disposed within the valve body between the third diaphragm and the base, the second ring having a channel through it from an inside peripheral surface to an outside peripheral surface for passage of any fluids which may leak between the third diaphragm and base.

3. A valve assembly as claimed in claim 2 wherein the spring means comprises a pair of springs, wherein a first spring is disposed concentrically within a second spring, and wherein the valve assembly further comprises a spring containment body disposed within inside peripheral surface of the second ring, wherein the spring containment body comprises a hollow chamber that encapsulates the springs therein and isolates the springs from the second ring, wherein the spring containment body is adapted to be displaced axially to accommodate spring compression and expansion, and wherein the spring containment body has a peripheral edge the forms a leak-tight seal with the second ring.

4. A valve assembly as claimed in claim 2 further comprising a leak detection passage extending from the region between the first and second diaphragms surrounding the outside peripheral surface of the first ring through the valve body to an exterior surface of said valve body for the passage of fluids which may leak through the second diaphragm.

5. A valve assembly as claimed in claim 1 wherein the valve stem is integral with the second diaphragm.

6. A valve assembly as claimed in claim 5 wherein the valve plug is integral with the third diaphragm.

7. A valve assembly as claimed in claim 5 further comprising:
   a second fluid outlet through the valve body;
   a second valve plug integral with an end of the valve stem that is integral with the second diaphragm; and
   a valve seat positioned at the edge of each end of the valve body central chamber;
   wherein placement of each valve plug against a respective valve seat directs the liquid flow through the valve body from the liquid inlet to one of the liquid outlets.

8. A valve assembly comprising:
   (a) a valve body having a top and a bottom, with a fluid inlet passage through the side of the valve body at a first location and a fluid outlet passage through the side of the valve body at a second location;
   (b) a valve seat in the valve body facing toward the valve body bottom and located between the inlet and outlet passages;
   (c) a cap removably mounted on the top of the valve body;
   (d) a first flexible imperforate diaphragm mounted on the inside of the cap;
   (e) a second flexible imperforate diaphragm mounted across an upper portion of the valve body above the valve seat, the second diaphragm spaced below the first diaphragm and forming an upper barrier for fluid flowing through the valve, wherein the space between the first and second diaphragms forms an upper fluid containment chamber;
   (f) a base removably mounted on the bottom of the valve body;
   (g) a third flexible imperforate diaphragm mounted across a lower portion of the valve body below the valve seat, the third diaphragm spaced below the second diaphragm and forming a lower barrier for fluid flowing through the valve;
   (h) a poppet assembly connected between the second and third diaphragms which moves with the diaphragms, the poppet assembly comprising:

(1) an imperforate valve plug connected to an upwardly facing surface of the third diaphragm, the valve plug having a recess and being configured for engaging the valve seat to thereby stop the flow of fluids through the valve, wherein the valve body includes a groove disposed therein and positioned concentrically around the valve seat to permit the valve seat to flex outwardly when engaged to the valve plug to thereby enhance the seal between the valve plug and seat when the two are engaged; and (2) imperforate valve stem connected at its top end to a downwardly facing surface of the second diaphragm and extending downwardly through a center portion of the valve body, the bottom end of the valve stem removably connected to the valve plug recess to eliminate a potential leak path therebetween;

(i) spring means mounted in a space between the third diaphragm and the base for biasing the poppet assembly and connected second and third diaphragms in an upwardly direction for engaging the valve plug with the valve seat to thereby close the valve;

(j) an annular backup ring mounted in the upper fluid containment chamber, the ring having a channel through It from its inside peripheral surface to its outside peripheral surface for passage of any fluids which may leak into the chamber through the second diaphragm; and (k) a leak detection passage extending from the region of the upper containment chamber surrounding the outside peripheral surface of the backup ring through the valve body to the exterior surface of said valve body for the passage of fluids which may leak through the second diaphragm into the upper containment chamber.

9. A valve assembly as claimed in claim 8 wherein the valve stem has a closed distal end that has an outside surface adapted to form a releasible attachment within a complementary opening in the valve plug.

10. A valve assembly as claimed in claim 8 further comprising a spring containment body disposed between the third diaphragm and the base for enclosing the spring means therein and isolating the spring means from any liquid leaking past the third diaphragm, wherein the spring containment body has a thin wall sleeve to accommodate axial compression and expansion displacement of the spring means therein.

11. A valve assembly as claimed in claim 8, wherein the cap has a port through its center for entry of a fluid for actuating the valve.

12. A valve assembly as claimed in claim 8, wherein the first, second and third diaphragms are circular in construction and are in registration with each other, one above the other.

13. A valve assembly as claimed in claim 8, wherein the space formed between the third diaphragm and the base defines a lower fluid containment chamber.

14. A valve assembly as claimed in claim 13, wherein the valve additionally comprises a leak detection passage extending from the lower containment chamber through the valve body to its exterior surface for the passage of fluids which may leak through the third diaphragm into the lower containment chamber.

15. A valve assembly as claimed in claim 8, wherein the upper containment chamber backup ring comprises an outer peripheral portion extending between the first and second diaphragms, wherein the bottom surface of the ring contacts an annular segment of the upwardly facing surface of the second diaphragm, said annular segment extending from the outer peripheral edge of the second diaphragm radially inwardly a selected distance.

16. A valve assembly as claimed in claim 15, wherein the portion of the ring's bottom surface which is in contact with the annular segment of the second diaphragm when the valve is closed is in a horizontal plane.

17. A valve assembly as claimed in claim 8, wherein the spring means comprises a pair of coil springs, one of the springs having a larger diameter than the other, with the smaller diameter spring nested within the larger diameter spring.

18. A valve assembly as claimed in claim 8, wherein the inside surfaces of the top and bottom portions of the valve body are tapered outwardly, an upwardly facing annular groove is around the base of the taper in the top portion of the valve body and a downwardly facing annular groove is around the base of the taper in the bottom portion of the valve body, wherein the second and third diaphragms have flanges extending axially from their peripheral edges, the flange of the second diaphragm being mounted in the upwardly facing annular groove and the flange of the third diaphragm being mounted in the downwardly facing annular groove, wherein the diameter of the first and second diaphragms is a selected amount greater than the diameter of the annular grooves, so that when the diaphragm flanges are mounted in the annular grooves, the diaphragm surfaces are slack.

19. A valve assembly as claimed in claim 8, wherein the surface area of the second diaphragm exposed to the pressure of fluid flowing through the valve is substantially the same as the surface area of the third diaphragm which is exposed to such fluid pressure, wherein the resulting upward force on the second diaphragm provided by such fluid is balanced by the downward force provided by the fluid on the third diaphragm.

20. A valve assembly as claimed in claim 8, wherein the valve plug is integrally formed with the third diaphragm and an annular V-shaped groove is around the base of the valve plug between the plug and the diaphragm.

21. A valve assembly as claimed in claim 8 additionally comprising an annular backup ring mounted in a space defined between the third diaphragm and the base, the space being a lower fluid containment chamber, wherein tightening means are on the backup ring to eliminate the slack in the surface of the third diaphragm.

22. A valve assembly as claimed in claim 8 additionally comprising an annular backup ring mounted in a space defined between the third diaphragm and the base, the space being a lower fluid containment chamber, the ring having a channel through it from its inside peripheral surface to its outside peripheral surface for passage of fluids which may leak into the chamber through the third diaphragm, wherein the top surface of the ring contacts an annular segment of a downwardly facing surface of the third diaphragm, the annular segment extending from the outer peripheral edge of the third diaphragm radially inwardly a selected distance, wherein the portion of a top surface of the ring which is in contact with the annular segment when the valve is closed slopes upwardly from the periphery of the ring toward its center.

23. A valve assembly comprising:
(a) a valve body having a top and a bottom, with a fluid inlet passage through the side of the valve body at a first location and a fluid outlet passage through the side of the valve body at a second location, the first location spaced apart radially from the second location:

(b) a valve seat in the valve body facing toward the valve body bottom and located between the inlet and outlet passages;

(c) a cap removably mounted on the top of the valve body, the cap having a port through its center for entry of a fluid for actuating the valve;

(d) a first flexible imperforate diaphragm mounted on the inside of the cap, wherein a space is defined between the upper surface of the diaphragm and the inner surface of the cap, the actuating fluid port opening into said space;

(e) a second flexible imperforate diaphragm mounted across an upper portion of the valve body above the valve seat, the second diaphragm forming an upper barrier for fluid flowing through the valve and being in registration with the first diaphragm, wherein the space between the first and second diaphragms forms an upper fluid containment chamber;

(f) a base removably mounted on the bottom of the valve body;

(g) a third flexible imperforate diaphragm mounted across a lower portion of the valve body below the valve seat, the third diaphragm forming a lower barrier for fluid flowing through the valve and being in registration with the first and second diaphragms, wherein the space between the third diaphragm and the base forms a lower fluid containment chamber;

(h) a poppet assembly connected between the second and third diaphragms which moves with the diaphragms, the poppet assembly comprising:

(1) an imperforate valve plug connected to an upwardly facing surface of the third diaphragm, the valve plug having a recess and being configured for engaging the valve seat to thereby stop the flow of fluids through the valve; and (2) an imperforate valve stem connected at a top end to a downwardly racing surface of the second diaphragm and extending downwardly through a center portion of the valve body, wherein the valve stem includes a closed distal end that is removably connected to the valve plug recess to prevent the passage of leaking fluid therebetween;

(i) spring means in the lower containment chamber for biasing the poppet assembly and connected second and third diaphragms in an upwardly direction for engaging the valve plug with the valve seat to thereby close the valve;

(j) a first annular backup ring mounted in the upper fluid containment chamber, an outer portion of the first ring extending between the first and second diaphragms, a bottom surface of the first ring contacting an annular segment of an upwardly facing surface of the second diaphragm, said annular segment extending from an outer peripheral edge of the second diaphragm radially inwardly a selected distance, the first ring having a channel through it from an inside peripheral surface to an outside peripheral surface for passage of any fluids which may leak into the chamber through the second diaphragm;

(k) a leak detection passage extending from the region of the upper containment chamber surrounding the outside peripheral surface of the first ring through the said valve body to its exterior surface for the passage of fluids which may leak through the second diaphragm into the upper containment chamber; and (l) a second annular backup ring mounted in the lower containment chamber, the second ring having a channel through it from its inside peripheral surface to an outside peripheral surface for passage of fluids which may leak into the chamber through the third diaphragm, wherein a top surface of the second ring contacts an annular segment of a downwardly facing surface of the third diaphragm, the annular segment extending from an outer peripheral edge of the third diaphragm radially inwardly a selected distance, wherein the portion of the top surface of the second ring which is in contact with the annular segment when the valve is closed slopes upwardly from the periphery ring toward its center.

24. A valve assembly as claimed in claim 23 wherein the valve body includes a groove disposed therein that extends concentrically around the valve seat to permit the valve seat to flex outwardly when engaged with the valve plug to thereby enhance the seal between the valve plug and seat when the two are engaged.

25. A valve assembly as claimed in claim 23 wherein the spring means is encapsulated within a containment body disposed within the inside peripheral surface of the second ring, wherein the containment body is adapted to accommodate axial displacement of the spring means and forms a leak-tight seal at a peripheral edge with the second ring to isolate the spring means from any liquid leaking past the third diaphragm.

26. A valve assembly as claimed in claim 23 wherein the valve stem distal end has an outside surface adapted to form a releasible snap attachment within a complementary opening within the valve plug.

27. A valve assembly as claimed in claim 26 wherein the valve plug includes means for releasing the attachment with the valve stem.

28. A valve assembly comprising:

(a) a valve body having a top and a bottom, a fluid inlet passage through the side of the valve body at a one location and at least one fluid outlet passage through the side of the valve body at another location, and having a central chamber extending therethrough;

(b) at least one valve seat in the valve body at an edge of the central chamber;

(c) a cap removably mounted on the top of the valve body;

(d) a first flexible imperforate diaphragm mounted on the inside of the cap;

(e) a second flexible imperforate diaphragm mounted across an upper portion of the valve body above the central chamber, the second diaphragm spaced below the first diaphragm and forming an upper barrier for fluid flowing through the valve, wherein the space between the first and second diaphragms forms an upper fluid containment chamber;

(f) a base removably mounted on the bottom of the valve body;

(g) a third flexible imperforate diaphragm mounted across a lower portion of the valve body below the central chamber, the third diaphragm spaced below the second diaphragm and forming a lower barrier for fluid flowing through the valve;

(h) a poppet assembly disposed within the valve body and connected between the second and third diaphragms which moves with the diaphragms, the poppet assembly comprising:

(1) an imperforate valve stem projecting axially away from a downwardly facing surface of the second diaphragm, and disposed within the central chamber;

(2) at least one valve plug disposed at one end of the valve stem, the valve plug being configured to engage the valve seat to thereby stop the flow of liquid through the valve;

(i) spring means in a space between the third diaphragm and the base for biasing the poppet assembly and connected second and third diaphragms in an upwardly direction;

(j) a containment body disposed between the third diaphragm and base for encapsulating the spring means therein, the containment body having a thin wall construction to accommodate axial displacement of the spring means, and having a peripheral edge that forms a leak-tight seal against the base to isolate the spring means from any liquid that leaks past the third diaphragm;

(k) an annular backup ring mounted in the upper fluid containment chamber, the ring having a channel through it from an inside peripheral surface to an outside peripheral surface for passage of any fluids which may leak into the chamber through the second diaphragm; and (l) a leak detection passage extending from the region of the upper containment chamber surrounding the outside peripheral surface of the backup ring through the valve body to the exterior surface of said valve body for the passage of fluids which may leak through the second diaphragm into the upper containment chamber.

29. The valve assembly as claimed in claim 28 wherein the valve body includes a groove disposed concentrically around the valve seat to permit the valve seat to flex outwardly when engaged with a respective valve plug to thereby enhance the seal between the valve plug and seat when the two are engaged.

30. The valve assembly as claimed in claim 28 wherein the at least one valve plug is integral with one of the second or third diaphragm.

31. A valve assembly comprising:
   a valve body having a central chamber that extends therethrough, having a fluid inlet and a fluid outlet each disposed through wall portions of the valve body; and having an open top end and an open bottom end;
   a valve seat at an edge of the central chamber, wherein the valve body includes a groove disposed concentrically around the valve seat;
   a poppet assembly disposed within the valve body, the poppet assembly comprising:
      an imperforate valve stem disposed within the central chamber; and
      an imperforate valve plug having a recess and being attached at the recess to one end of the valve stem to prevent fluid migration therebetween, wherein the valve plug is positioned outside of the central chamber adjacent the valve seat;
   a cap attached to the valve body top end;
   a first flexible imperforate diaphragm disposed within the valve body between the poppet assembly and the cap, and connected to one end of the poppet assembly, wherein the first diaphragm forms a leak-tight seal with the valve body;
   a base attached to the valve body bottom end;
   a second flexible imperforate diaphragm disposed in the valve body between the poppet assembly and the base, and connected to an end of the poppet assembly opposite the first diaphragm, wherein the second diaphragm forms a leak-tight seal with the valve body; and
   spring means disposed between the base and the second diaphragm for imposing a biasing force onto the poppet assembly;
   wherein placement of the valve plug against the valve seat prevent liquid migration through the valve from the fluid inlet to the fluid outlet.

32. A valve assembly as claimed in claim 31 further comprising a movable actuating member disposed within the cap above the first flexible imperforate diaphragm.

33. A valve assembly as recited in claim 31 further comprising a containment body disposed between the second diaphragm and base for encapsulating the spring means therein, the containment body having a thin wall construction to accommodate axial displacement of the spring means, and having a peripheral edge that forms a leak-tight seal against the base to isolate the spring means from any liquid that leaks past the second diaphragm.

34. A valve assembly comprising:
   (a) a valve body having a top and a bottom, a fluid inlet passage through the side of the valve body at a one location and at least one fluid outlet passage through the side of the valve body at another location, and having a central chamber extending therethrough;
   (b) at least one valve seat in the valve body at an edge of the central chamber;
   (c) a cap removably mounted on the top of the valve body;
   (d) a movable actuating member mounted on the inside of the cap;
   (e) a first flexible imperforate diaphragm mounted across an upper portion of the valve body above the central chamber, the first diaphragm spaced below the movable member and forming an upper barrier for fluid flowing through the valve, wherein the space between the movable member and first diaphragm forms an upper fluid containment chamber;
   (f) a base removably mounted on the bottom of the valve body;
   (g) a second flexible imperforate diaphragm mounted across a lower portion of the valve body below the central chamber, the second diaphragm spaced below the first diaphragm and forming a lower barrier for fluid flowing through the valve;
   (h) a poppet assembly disposed within the valve body and connected between the first and second diaphragms which moves with the diaphragms, the poppet assembly comprising:
      (1) an imperforate valve stem projecting axially away from a downwardly facing surface of the second diaphragm, and disposed within the central chamber;
      (2) at least one valve plug disposed at one end of the valve stem, the valve plug being configured to engage the valve seat to thereby stop the flow of liquid through the valve;
   (i) spring means in a space between the second diaphragm and the base for biasing the poppet assembly and connected first and second diaphragms in an upwardly direction;
   (j) a containment body disposed between the second diaphragm and base for encapsulating the spring means therein, the containment body having a thin wall construction to accommodate axial displacement of the spring means, and having a peripheral edge that forms a leak-tight seal against the base to isolate the spring means from any liquid that leaks past the second diaphragm; and (k) a leak detection passage extending from upper fluid containment chamber through the valve body to the exterior surface of said valve body for the passage of fluids which may leak through the first diaphragm into the upper containment chamber.

35. The valve assembly recited in claim 34 wherein the valve body includes a groove disposed concentrically around the valve seat.

* * * * *

UNITED STATES PATENT AND TRADEMARK OFFICE
CERTIFICATE OF CORRECTION

PATENT NO.   : 5,967,173  
DATED        : October 19, 1999  
INVENTOR(S)  : Kenji A. Kingsford and Hy Ba Nguyen It is certified that error appears in the above-identified patent and that said Letters Patent is hereby corrected as shown below:

<u>Title page,</u>
Item [73], Assignee should read -- Furon Company, Laguna Niguel, Calif. --.

Signed and Sealed this

Twentieth Day of August, 2002

*Attest:*

*Attesting Officer*

JAMES E. ROGAN  
*Director of the United States Patent and Trademark Office*